(12) United States Patent
Wang

(10) Patent No.: US 7,201,092 B2
(45) Date of Patent: Apr. 10, 2007

(54) BAND SAW

(76) Inventor: Vivian Wang, No. 180-2, Lane 92, Fengnan St., Fengyuan City, Taichung County (TW)

( * ) Notice: Subject to any disclaimer, the term of this patent is extended or adjusted under 35 U.S.C. 154(b) by 71 days.

(21) Appl. No.: 11/196,312

(22) Filed: Aug. 4, 2005

(65) Prior Publication Data

US 2007/0028745 A1 Feb. 8, 2007

(51) Int. Cl.
*B23D 53/00* (2006.01)
(52) U.S. Cl. ............................. 83/813; 83/809
(58) Field of Classification Search ................. 83/806, 83/809, 813, 871, 788; 144/130, 43, 185, 144/187, 193.1
See application file for complete search history.

(56) References Cited

U.S. PATENT DOCUMENTS

| 547,433 | A | * | 10/1895 | Hazewinkel | 83/813 |
| 4,048,883 | A | * | 9/1977 | Lecrone | 83/813 |
| 4,307,641 | A | * | 12/1981 | Shapleigh | 83/813 |
| 4,606,254 | A | * | 8/1986 | Schmalz | 83/813 |
| 5,213,022 | A | * | 5/1993 | Elgan | 83/813 |
| 6,766,725 | B2 | * | 7/2004 | Yeh | 83/813 |
| 6,895,843 | B1 | * | 5/2005 | Hurdle, Jr. | 83/813 |
| 6,966,246 | B2 | * | 11/2005 | Yeh | 83/813 |

* cited by examiner

*Primary Examiner*—Stephen Choi
(74) *Attorney, Agent, or Firm*—Rosenberg, Klein & Lee

(57) ABSTRACT

A band saw is disclosed to includes a holder frame, which is movable along two vertical guide rods above the machine base and holds a saw blade and a saw blade driving mechanism, a nut fixedly provided at the top of the holder frame, a vertical motor mounted on a connecting frame at the top of the guide rods, and a screw rod threaded into the fixed nut and rotatable by the vertical motor to move the holder frame along the guide rods to the desired elevation.

2 Claims, 3 Drawing Sheets

BAND SAW

BACKGROUND OF THE INVENTION

1. Field of the Invention

The present invention relates to a saw machine and more particularly, to a band saw, which allows the user to adjust the elevation of the saw blade conveniently and rapidly.

2. Description of the Related Art

A conventional band saw uses a driving mechanism to rotate a saw blade, thereby causing the saw blade to cut the workpiece. To fit a different cutting requirement, the saw blade has to be adjusted to a different elevation. According to conventional designs, it is complicated to adjust the elevation of the saw blade.

SUMMARY OF THE INVENTION

The present invention has been accomplished under the circumstances in view. It is the main object of the present invention to provide a band saw, which enables the user to adjust the elevation of the saw blade conveniently and rapidly. To achieve this and other objects of the present invention, the band saw comprises a holder frame, which is movable along two vertical guide rods above the machine base and holds a saw blade and a saw blade driving mechanism, a nut fixedly provided at the top of the holder frame, a vertical motor mounted on a connecting frame at the top of the guide rods, and a screw rod threaded into the fixed nut and rotatable by the vertical motor to move the holder frame along the guide rods to the desired elevation. Further, the holder frame has reinforcing ribs to reinforce the structural strength.

DETAILED DESCRIPTION OF THE PREFERRED EMBODIMENT

Figure 1:
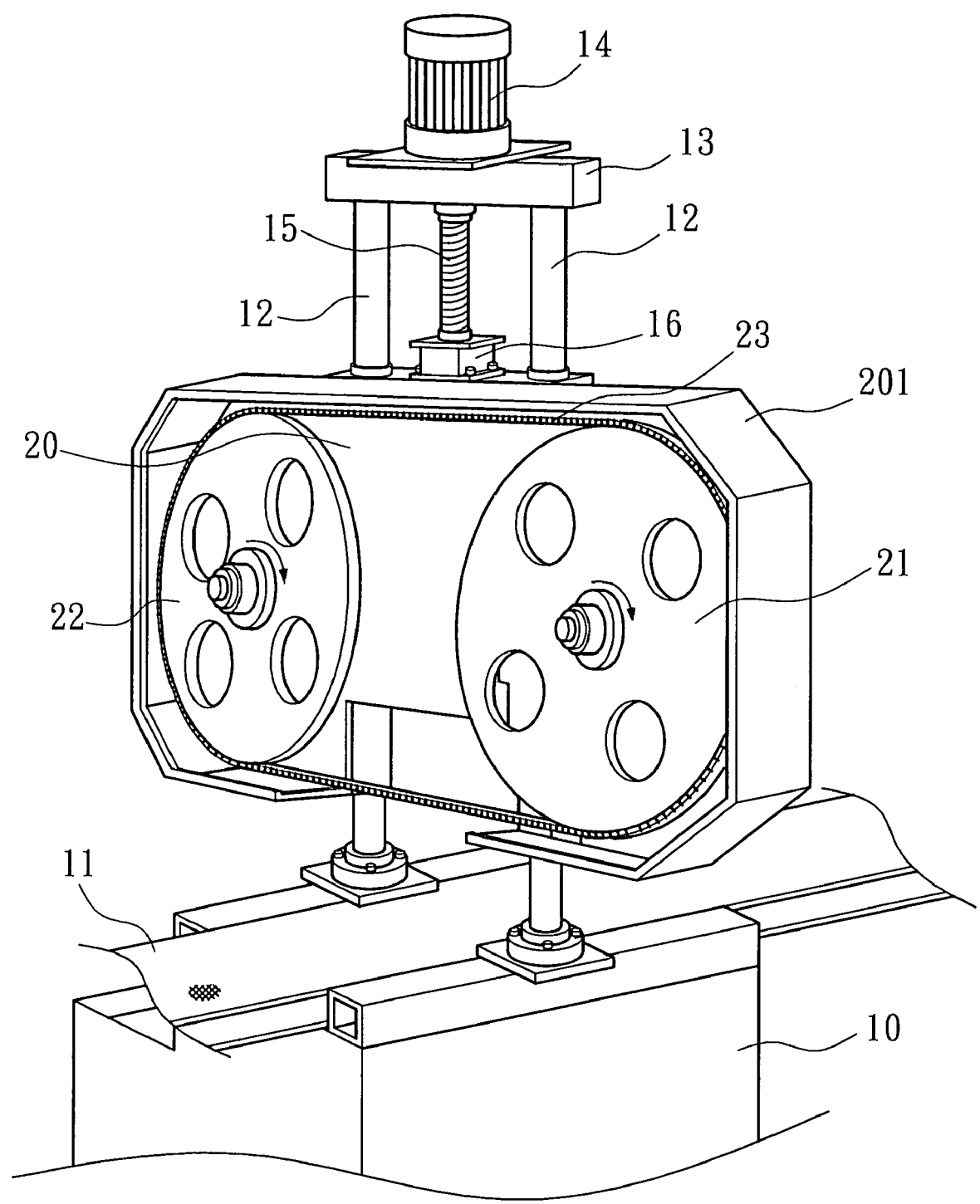
FIG. 1 is an elevational view of a band saw according to the present invention.
Figure 2:
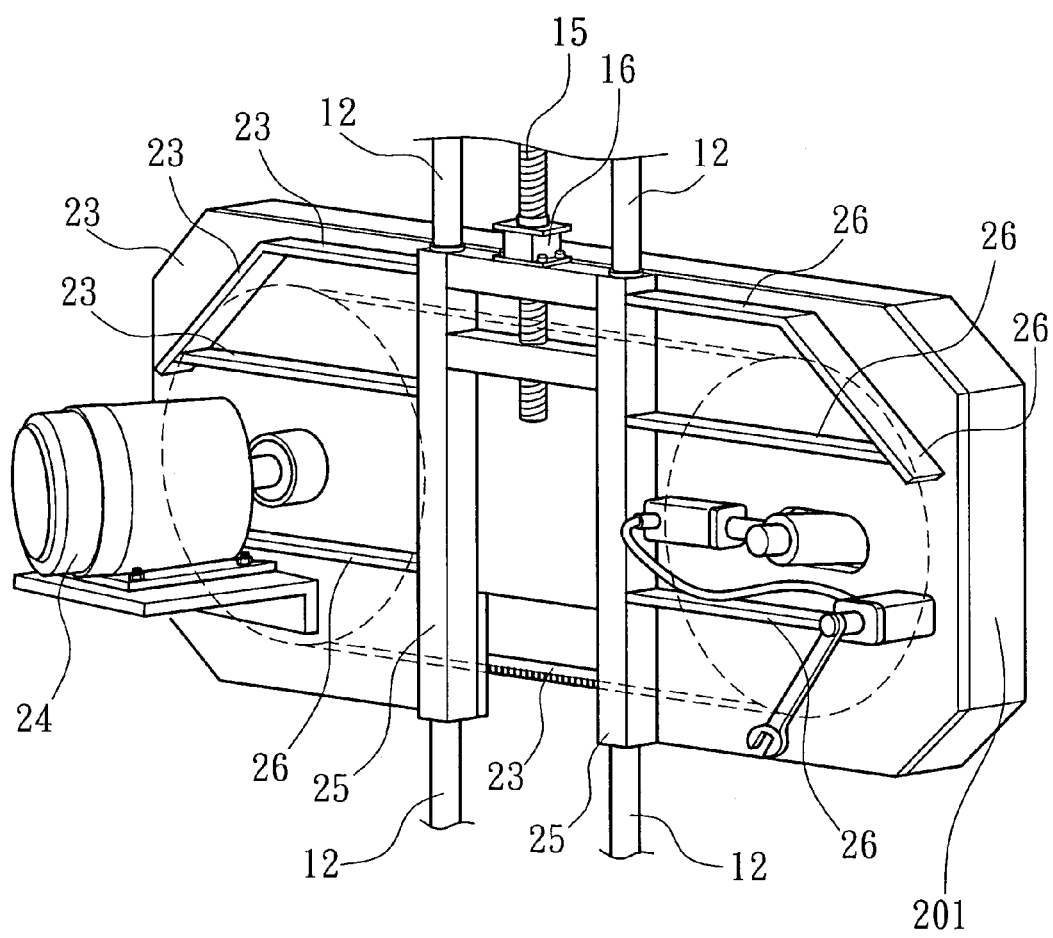
FIG. 2 is a perspective rear side view of the holder frame of the band saw according to the present invention.
Figure 3:
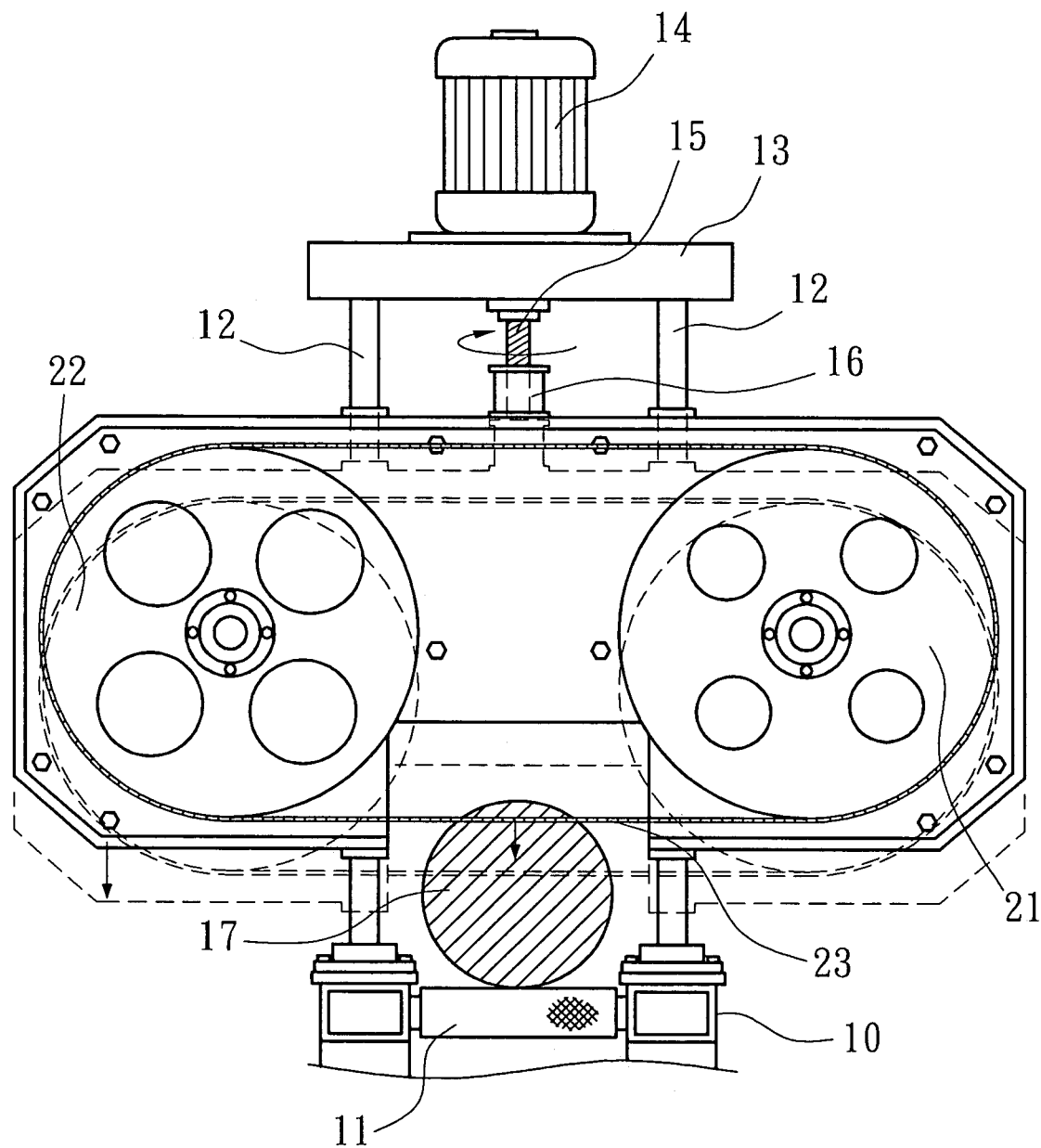
FIG. 3 is a schematic drawing showing the adjustment of the elevation of the holder frame according to the present invention.

Referring to FIGS. 1~3, a band saw in accordance with the present invention is shown comprised of a machine base 10, a conveyer 11 and a holder frame 20 mounted on the machine base 10. The holder frame 20 supports a motor 24, a driving wheel 21, a driven wheel 22, and a saw blade 23 around the driving wheel 21 and the driven wheel 22. When started the motor 24, the driving wheel 21 and the driven wheel 22 are rotated to move the saw blade 23 against the workpiece 17 being carried on the conveyer 11, thereby cutting the workpiece 17. Further, a saw blade guard 201 is provided around the border area of the holder frame 20 to protect the saw blade 23.

The vertical sleeves 25 are fixedly provided at the holder frame 20 and arranged in parallel. A fixed nut 16 is fixedly provided at the top side of the holder frame 20 on the middle between the vertical sleeves 25. Two vertical guide rods 12 are respectively inserted through the vertical sleeves 25 and fixedly connected to the machine base 10 at the top. A connecting frame 13 is affixed to the guide rods 12 at the top side to support a vertical motor 14. A vertical screw rod 15 is connected to the output shaft of the vertical motor 14 and threaded into the fixed nut 16. Further, the holder frame 20 and the blade guard 201 has reinforcing ribs 26 to reinforce the structural strength.

When wishing to adjust the height of the saw blade 23 to fit a different cut depth, the vertical motor 14 is controlled to rotate the screw rod 15 clockwise, thereby lifting the holder frame 20 along the guide rods 12. On the contrary, when controlling the vertical motor 14 to rotate the screw rod 15 counter-clockwise, the holder frame 20 is lowered along the guide rods 12. Therefore, the saw blade 23 can conveniently and rapidly adjusted to the desired elevation.

Further, because the reinforcing ribs 26 are formed on the holder frame 20 and saw blade guard 201 at the back side, the band saw can bear a high reactive force during a cutting operation.

Although a particular embodiment of the invention has been described in detail for purposes of illustration, various modifications and enhancements may be made without departing from the spirit and scope of the invention.

The invention claimed is:

1. A band saw comprising a machine base, a conveyer mounted on said machine base for carrying the workpiece to be cut, a holder frame mounted on said machine base above said conveyer, a driving wheel and a driven wheel pivotally mounted on said holder frame, a saw blade mounted on said driving wheel and said driven wheel, a motor mounted on said holder frame and adapted to rotate said driving wheel and to further move said saw blade against the workpiece being carried on said conveyer, wherein a saw blade elevation adjustment structure is installed in said machine base for controlling the elevation of said holder frame above said machine base, said saw blade elevation adjustment structure comprising two vertical sleeves fixedly provided at said holder and arranged in parallel, a fixed nut fixedly provided at a top side of said holder frame on the middle between said two vertical sleeves, two vertical guide rods respectively inserted through said vertical sleeves and fixedly connected to said machine base, connecting frame affixed to said guide rods at a top side to support, a vertical motor mounted on said connecting frame, and a vertical screw rod threaded into said fixed nut and coupled to said vertical motor at said connecting frame for turning by said vertical motor at said connecting frame to move said holder frame along said guide rods.

2. The band saw as claimed in claim 1, wherein said holder frame has a plurality of reinforcing ribs.

* * * * *